United States Patent
Virani et al.

(10) Patent No.: US 8,075,672 B2
(45) Date of Patent: Dec. 13, 2011

(54) METHOD OF REMOVING NITROUS OXIDE

(75) Inventors: Naheed Virani, Los Angeles, CA (US);
Thomas Seagraves, Port Jefferson, NY (US); Wayne David Musselman, Pearland, TX (US); William Stewart Chan, Rosharon, TX (US); Kent S. Knaebel, Plain City, OH (US); Heungsoo Shin, Dublin, OH (US)

(73) Assignee: BASF SE, Rheinland-Pfalz (DE)

( * ) Notice: Subject to any disclaimer, the term of this patent is extended or adjusted under 35 U.S.C. 154(b) by 647 days.

(21) Appl. No.: 12/088,319

(22) PCT Filed: Sep. 27, 2006
(Under 37 CFR 1.47)

(86) PCT No.: PCT/US2006/037797
§ 371 (c)(1),
(2), (4) Date: Jan. 2, 2009

(87) PCT Pub. No.: WO2007/038661
PCT Pub. Date: Apr. 5, 2007

(65) Prior Publication Data
US 2010/0071552 A1 Mar. 25, 2010

Related U.S. Application Data

(60) Provisional application No. 60/720,891, filed on Sep. 27, 2005.

(51) Int. Cl.
*B01D 53/02* (2006.01)

(52) U.S. Cl. ............ 95/105; 95/128; 95/129; 423/239.1

(58) Field of Classification Search .................... 95/105, 95/128, 129; 423/239.1
See application file for complete search history.

(56) References Cited

U.S. PATENT DOCUMENTS

| 4,507,271 A | 3/1985 | Van Deyck et al. |
| 5,032,150 A | 7/1991 | Knaebel |
| 5,531,809 A * | 7/1996 | Golden et al. .................. 95/101 |

(Continued)

FOREIGN PATENT DOCUMENTS

DE 19808939 A1 9/1999

(Continued)

OTHER PUBLICATIONS

English language abstract for DE19808939 extracted from espacenet.com, May 13, 2008.

(Continued)

*Primary Examiner* — Robert J Hill, Jr.
*Assistant Examiner* — Christopher P Jones
(74) *Attorney, Agent, or Firm* — Howard & Howard Attorneys PLLC

(57) ABSTRACT

Hydroxylamine is formed in a reactor through a partial hydrogenation of nitric oxide gas (NO) with hydrogen gas ($H_2$) in an aqueous medium with nitrogen gas ($N_2$) as an inert gas. The formation of the hydroxylamine forms nitrous oxide gas ($N_2O$). The gases and the water vapor are flowed away from the reactor in a vent gas stream enabling recycling of the gases. The $N_2O$ is removed from the vent gas stream to reduce flammability. Once the $N_2O$ is removed, the NO, $H_2$, and $N_2$ are recycled and re-used in the reactor to form additional hydroxylamine. The $N_2O$ removed from the vent gas stream is of high purity and can be commercially sold or economically discarded.

30 Claims, 2 Drawing Sheets

U.S. PATENT DOCUMENTS

| | | | |
|---|---|---|---|
| 5,792,239 | A | 8/1998 | Reinhold, III et al. |
| 6,002,019 | A | 12/1999 | Tamhankar et al. |
| 6,080,226 | A | 6/2000 | Dolan et al. |

FOREIGN PATENT DOCUMENTS

| | | | |
|---|---|---|---|
| EP | 0862938 A1 | 9/1998 |
| EP | 1275616 A1 | 1/2003 |
| EP | 1417995 A1 | 5/2004 |
| JP | 59109226 A | 6/1984 |
| JP | 70275631 A | 10/1995 |

OTHER PUBLICATIONS

PCT International Search Report for PCT/US2006/037797, 3 pages, Jul. 3, 2007.

English language abstract for JP 59-109226 extracted from espacenet.com database Mar. 18, 2011, 5 pages.

English language translation and abstract for JP 07-0275631 extracted from PAJ and espacenet.com databases, 15 pages.

* cited by examiner

METHOD OF REMOVING NITROUS OXIDE

This application is a U.S. national stage application of International Patent Application No. PCT/US2006/037797, filed on Sep. 27, 2006, which claims priority to U.S. Provisional Patent Application No. 60/720,891 filed on Sep. 27, 2005.

FIELD OF THE INVENTION

The present invention generally relates to a method of removing nitrous oxide. More specifically, the present invention relates to a method of using pressure swing adsorption and a nitrous oxide adsorbent material for removing the nitrous oxide in a vent gas formed from a synthesis of hydroxylamine and recycling remaining gases in the vent gas.

BACKGROUND OF THE INVENTION

Nitrous oxide gas, ($N_2O$), is produced as a by-product in a synthesis of hydroxylamine. Hydroxylamine may be used to form a caprolactam that can be used to form nylon 6. Nylon 6 is an important polymer that is used throughout the world in carpets, apparel, upholstery, auto parts, and in many other products.

Typically, hydroxylamine is formed from partially hydrogenating nitric oxide gas (NO) with hydrogen gas ($H_2$) in an aqueous medium including nitrogen gas ($N_2$) as an inert gas. Mixing the NO with the $H_2$ and the $N_2$ forms hydroxylamine in addition to a variety of by-products. The by-products include $N_2O$. The $N_2O$, in addition to unused $N_2$, $H_2$, and NO along with water vapor ($H_2O$), may be evacuated from the hydroxylamine as a moist gas mixture that may be disposed of or recycled. The gas mixture may also include contaminants including methane, carbon dioxide ($CO_2$), and carbon monoxide (CO). The gas mixture may be recycled along with $H_2$ and NO to reduce overall consumption of $H_2$ and NO.

However, if the gas mixture and the $H_2$ and NO are recycled, a level of the $N_2O$ can accumulate in the gas mixture to dangerous levels. If the level of $N_2O$ in the gas mixture becomes too high, the gas mixture becomes flammable and unsafe to handle. If the level of $N_2O$ reaches a predetermined upper limit, the gas mixture is discarded, resulting in loss of $H_2$, and NO remaining in the gas mixture. Removal of $N_2O$ from the gas mixture would preferably prevent premature disposal of the gas mixture along with $H_2$ and NO thereby allowing recycling of the $H_2$ and NO and reducing overall consumption.

Adsorption can provide a more efficient and economic means for separating gases than use of cryogenic distillation, absorption, or membrane-based systems. Adsorption can be used to separate a gas from the gas mixture that includes at least two gases that have different adsorption characteristics toward an adsorbent material.

Typically, adsorption generally includes a synchronized cycling of a pressure or temperature of one or a plurality of adsorbent beds. The adsorbent bed includes the adsorbent material that preferentially adsorbs one or more gases present in the gas mixture. Pressure swing adsorption (PSA) generally includes a series of steps that change the pressure and/or flow direction of the gas mixture to achieve separation of a preferred gas from a series of non-preferred gases. The number and nature of the steps involved in PSA may vary based on separation objectives.

More specifically, PSA typically includes flowing the gas mixture from a feed inlet of the adsorbent bed to a discharge end of the adsorbent bed, at an adsorption pressure. A gas in the gas mixture that has strong adsorption characteristics preferentially adsorbs onto the adsorbent material, while a gas with weak adsorption characteristics continues to flow through the adsorbent bed. As such, the gas mixture flowing out of the discharge end of the adsorbent bed is substantially depleted of the gas preferentially adsorbed onto the adsorbent material.

As the gas with the strong adsorption characteristics flows from the feed inlet to the discharge end, the gas with the strong adsorption characteristics accumulates on the adsorbent material closest to the feed inlet. As the accumulation proceeds, the adsorbent material closest to the feed inlet becomes saturated first, followed by saturation of the entire adsorbent material in the direction of flow of the gas mixture.

Eventually, once the entire adsorbent material becomes saturated, the gas with the strong adsorption characteristics breaks through the discharge end. Usually, the flow of the gas mixture is stopped before breakthrough occurs. Once the flow of the gas mixture is stopped, the gas with the weak adsorption characteristics may be removed without excessively desorbing the gas adsorbed onto the adsorbent material. After the adsorbent pressure is reduced, the adsorbent bed is further depressurized and the gas adsorbed onto the adsorbent material is removed from the bed. The adsorbent bed is then purged and re-pressurized to the adsorption pressure with the gas having the weak adsorption characteristics. Once this occurs, the adsorbent bed may be reused.

The adsorbent materials that may be used with PSA are dependent on the gas to be adsorbed, the gas mixture itself, and other factors that are well known to those skilled in the art. In general, suitable adsorbent materials include zeolite molecular sieves, silica gel, activated carbon, and activated alumina. For certain applications, specialized adsorbent materials can be used.

The efficiency of PSA depends on a variety of parameters including pressures, temperatures, volumes, and flow rates of gases in PSA systems, time of the synchronized pressure cycling, types, sizes, and shapes of the adsorbent materials, dimensions of the adsorbent beds, and compositions of feed, product, purge, and other intermediate gas streams. Variations in these parameters can influence the cost and productivity of the PSA systems.

Conventional PSA systems and cycles can remove $N_2O$ from the gas mixture. However, conventional PSA methods known in the art potentially form flammable gas mixtures of $N_2O$, $H_2$, and NO and many adsorbents do not exhibit a high selectivity for the $N_2O$ as compared to the $H_2O$ in the gas mixture. As such, there remains an opportunity to develop a PSA method that effectively separates $N_2O$ from $H_2O$ in the gas mixture such that $N_2O$ of high purity can be removed from the gas mixture using a minimum number of PSA systems and the $N_2$, $H_2$, and NO can be efficiently recycled.

BRIEF SUMMARY OF THE INVENTION AND ADVANTAGES

The present invention provides a method of removing nitrous oxide from a vent gas. In a first embodiment of the method, the vent gas includes the nitrous oxide and at least one other gas. The method includes the step of flowing the vent gas through a nitrous oxide adsorbent material. The nitrous oxide adsorbent material includes particles. The vent gas is flowed through the nitrous oxide adsorbent material such that the nitrous oxide is adsorbed onto the particles. The method also includes the step of forming a buffer zone, including nitrogen, adjacent to the nitrous oxide adsorbent material, which may prevent flammable compositions from forming. The method further includes the step of flowing additional nitrous oxide through the nitrous oxide adsorbent material to displace the other gas. The method still further includes desorbing the nitrous oxide from the nitrous oxide adsorbent material.

In a second embodiment of the method, the method includes all of the steps of the first embodiment and additionally includes the step of forming a second buffer zone, including nitrogen, adjacent to the nitrous oxide adsorbent material after desorbing the nitrous oxide from the nitrous oxide adsorbent material.

In a third embodiment of the method, the method includes the step of synthesizing hydroxylamine thereby producing the vent gas. The third embodiment also includes the steps of flowing the vent gas through the nitrous oxide adsorbent material, forming the buffer zone and desorbing the nitrous oxide from the nitrous oxide adsorbent material, as in the first and second embodiments.

In a fourth embodiment of the method, the method includes the step of adsorbing the nitrous oxide from a vent gas onto a nitrous oxide adsorbent material. The fourth embodiment also includes the step of forming a buffer zone adjacent to the nitrous oxide adsorbent material. The fourth embodiment further includes the step of flowing additional nitrous oxide into the nitrous oxide adsorbent material. The fourth embodiment still further includes the step of desorbing the nitrous oxide from the nitrous oxide adsorbent material.

Accordingly, an effective method of removing highly pure nitrous oxide from vent gases are established. Flowing the additional nitrous oxide preferably displaces any of the vent gas from the nitrous oxide adsorbent material and allows the nitrous oxide to be removed from the nitrous oxide adsorbent material in high purity such that flammability is reduced.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE PRESENT INVENTION

Figure 1:
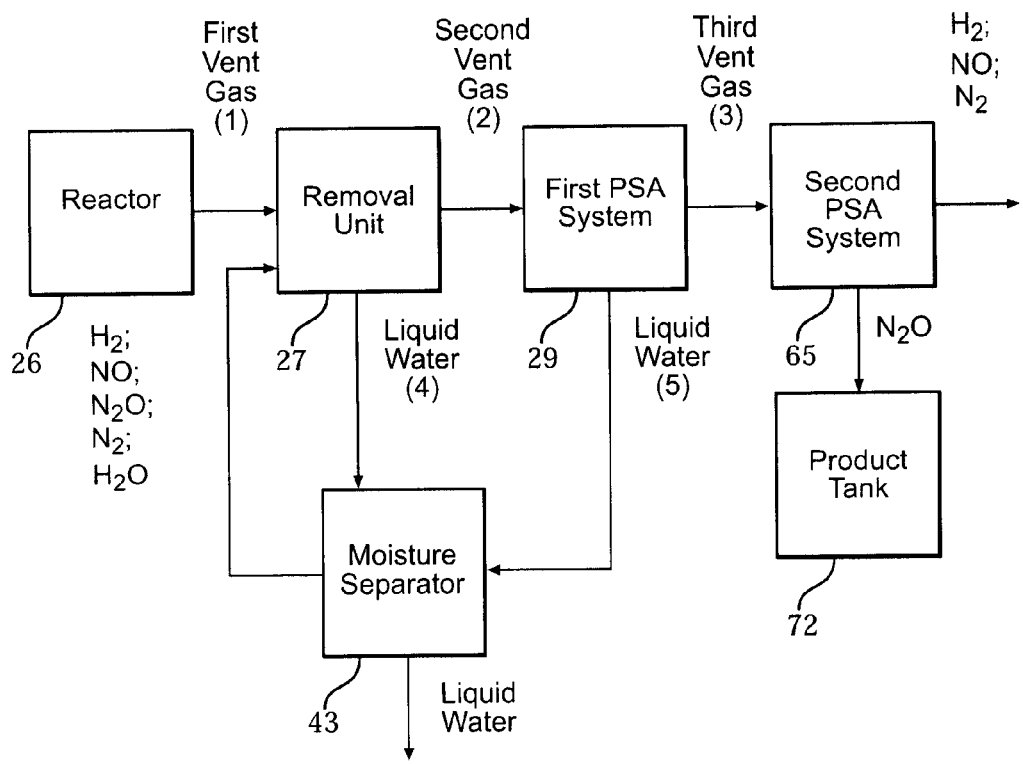
FIG. 1 is schematic view of an embodiment of the present invention generally illustrating a method wherein first, second, and third vent gases flow through a reactor, a removal unit, a first pressure swing adsorption (PSA) system, and a second PSA system.

A method of removing nitrous oxide gas ($N_2O$) from a vent gas including the $N_2O$ and at least one other gas is provided. It is to be understood that the vent gas may include any gas or gas stream including the $N_2O$. The vent gas, hereafter, will be referred to as a third vent gas (3), as the method of the present invention preferably utilizes first, second, and third vent gases (1, 2, 3). However, it is to be understood that the first and the second vent gases (1, 2) need not be utilized and are optional.

A first embodiment of the present invention includes the step of flowing the third vent gas (3) through a nitrous oxide adsorbent material (67). The nitrous oxide adsorbent material includes particles, which will be described in greater detail below. Typically, there are void spaces between the particles, which will also be described in greater detail below. The third vent gas (3) is flowed through the nitrous oxide adsorbent material (67) such that the nitrous oxide is adsorbed onto the particles. The first embodiment also includes the step of forming a buffer zone, including nitrogen, adjacent to the nitrous oxide adsorbent material (67). It is contemplated that the buffer zone may prevent or reduce formation of flammable compositions resulting from intermingling of gases. The first embodiment further includes the step of flowing additional nitrous oxide through the nitrous oxide adsorbent material (67) to displace the other gas. The first embodiment still further includes the step of desorbing the nitrous oxide from the nitrous oxide adsorbent material (67).

The third vent gas (3) includes at least one other gas. Typically, the other gas includes, but is not limited to, hydrogen gas ($H_2$), the $N_2O$, nitric oxide gas (NO), nitrogen gas ($N_2$) and water vapor ($H_2O$), in addition to other gases such as methane, and trace gases such as carbon dioxide ($CO_2$) and carbon monoxide (CO). It is contemplated that the $N_2O$ present in the third vent gas (3) may be formed as a by-product from a synthesis of hydroxylamine. The methane, $CO_2$ and CO may also be present as a result of the $H_2$ or NO that may be present in the third vent gas (3).

Typically, the $N_2O$ is present in the third vent gas (3) in an amount of from 3 to 15, and more typically of from 5 to 11, mol %. Also, the $H_2$ is typically present in the third vent gas (3) in an amount of at least 40 and more typically of at least 60, mol %. Further, the NO and the $N_2$ are typically each present in the third vent gas (3) in an amount of less than 30 and more typically of less than 25, mol %, each. Still further, the $H_2O$ may be present in the third vent gas (3) in any amount and typically in an amount that saturates the third vent gas (3) at a temperature of from 30-60° C. at a pressure of greater than 2 bar absolute. Typically, methane may be present in the third vent gas (3) in an amount of from 0.1 to 3.0 mol % while $CO_2$ and CO may be present in an amount of from 10 to 100 parts per one million parts of the third vent gas (3), each.

Hydroxylamine may be formed in a reactor (26) from partially hydrogenating NO with $H_2$ in an aqueous medium including nitrogen gas ($N_2$) as an inert gas. Mixing the NO with the $H_2$ and the $N_2$ forms hydroxylamine in addition to a variety of by-products. The by-products include $N_2O$. The $N_2O$, in addition to unused $N_2$, $H_2$, and NO along with $H_2O$, may be evacuated from the reactor (26) as the first vent gas (1), first introduced above. The first vent gas (1) may also include contaminants including methane, $CO_2$ and CO. The $H_2O$ may be removed from the first vent gas (1) thereby forming the second and third vent gases (2, 3), discussed in greater detail below. Ultimate removal of the $N_2O$ from the third vent gas (3) reduces safety and environmental hazards associated with flammability. Once removed, the $N_2O$ can be used as needed in other applications, commercially sold, or economically discarded.

The first embodiment of the present invention may be completed using a variety of adsorption techniques including, but not limited to, pressure swing adsorption (PSA) techniques, any other adsorption techniques known in the art, and combinations thereof. Preferably, the steps of the first embodiment are completed utilizing PSA techniques.

However, before the aforementioned steps of the first embodiment are performed, it is contemplated that the first vent gas (1) may be treated, as first introduced above. Preferably, if the first vent gas (1) includes the $H_2O$, the first vent gas (1) may be treated to remove the $H_2O$ in two contents including a first content (4) and a second content (5), respectively. Preferably, the first content is removed using a removal unit (27), thereby forming the second vent gas (2) that includes some residual $H_2O$. Preferably, the second content (5) is removed using a first PSA system (29), thereby forming the third vent gas (3) that includes a minimal amount of $H_2O$. In one embodiment, a minimal amount of $H_2O$ preferably includes an amount of $H_2O$ present in the third vent gas (3) of from 1 to 1,000, more preferably of from 10 to 100, even more preferably of from 10 to 50, still more preferably of from 15 to 40, and most preferably of from 20 to 25, parts of $H_2O$ per one million parts of the third vent gas (3). In another embodiment, the amount of $H_2O$ present in the third vent gas (3) is preferably of from 1 to 5,000, more preferably of from 5 to 500, and most preferably of from 10 to 100, parts of $H_2O$ per one million parts of the third vent gas (3). It is to be understood that the amount of $H_2O$ present in the third vent gas (3) may depend on product specifications of the nitrous oxide.

The first content (4) of the $H_2O$ may be substantially removed from the first vent gas (1) through use of the removal unit (27), first introduced above. In a preferred embodiment of the present invention, the removal unit (27) is in fluid communication with the reactor (26). The first vent gas (1) may be flowed from the reactor (26) into the removal unit (27). The removal unit (27) may include any apparatus that functions to remove the first content of the $H_2O$ from the first vent gas (1). Suitable examples of the first removal unit (27) include, but are not limited to, coolers, condensers, refrigerated dryers, gas scrubbers, and combinations thereof. Preferably, the first removal unit (27) is a refrigerated dryer and removes the first content (4) of the $H_2O$ from the first vent gas (1) as liquid water. It is desirable to remove $H_2O$ from the first vent gas (1) because a low content of the $H_2O$ in the first vent gas (1) allows for a more effective adsorption of the $N_2O$ onto the nitrous oxide adsorbent material (67). The first vent gas (1) preferably flows into the first removal unit (27) at a pressure of from 20 to 90, more preferably of from 25 to 50, and most preferably of from 30 to 40, psia, at a temperature of from 25 to 60° C.

If the first removal unit (27) includes the refrigerated dryer, the refrigerated dryer may include a shell and a refrigeration system disposed within the shell. The refrigeration system may be generally defined by a housing including a moisture separator (43), a sump, a discharge conduit, and a drain to evacuate the liquid water from the refrigerated dryer.

An evaporator may also be included in the housing of the refrigerated dryer. The first vent gas (1), flowing through the housing, may pass through the evaporator and be cooled to effect the removal of the first content (4) of the $H_2O$ from the first vent gas (1) thereby forming the second vent gas (2), as first introduced above. The first vent gas (1) may be cooled to a dew point such that the first content (4) of the $H_2O$ in the first vent gas (1) condenses to form the liquid water. In one embodiment, the first vent gas (1) is preferably cooled to a dew point of from 5 to 30° C., more preferably of from 8 to 16° C., and most preferably of from 10 to 14° C. In another embodiment, the first vent gas (1) is preferably cooled to a dew point of from 0 to 30° C., more preferably of from 5 to 20° C., and most preferably of from 5 to 15° C.

After being cooled to the dew point, the first vent gas (1) may subsequently flow through the moisture separator (43). The moisture separator (43) preferably removes the first content of the $H_2O$ from the refrigerated dryer. The liquid water may flow from the moisture separator (43) through the discharge conduit to the sump. The sump preferably pumps the liquid water to the drain and evacuates the liquid water from the refrigerated dryer.

Figure 2:
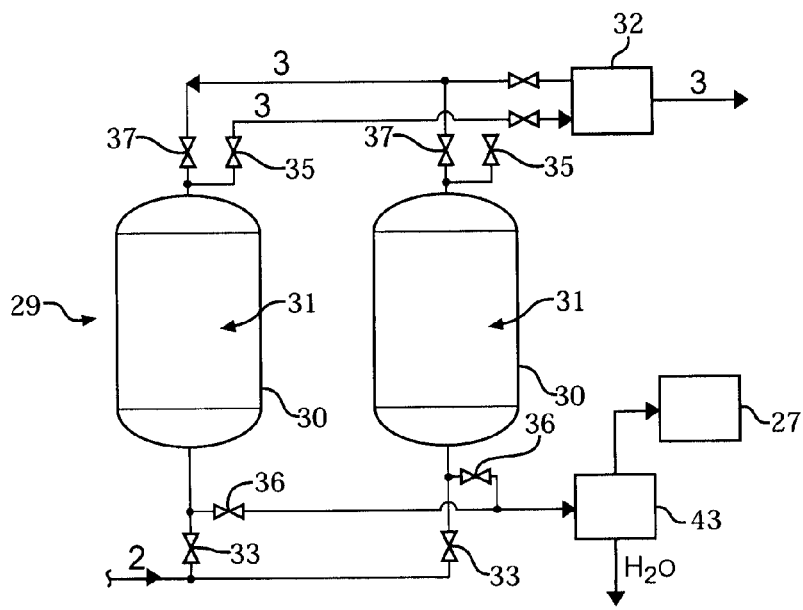
FIG. 2 is a schematic view of an embodiment of the present invention that is exemplary of the first PSA system that includes two first adsorbent beds.

If the second vent gas (2) is formed, the second vent gas (2) preferably exits the removal unit (27) through a removal outlet. The removal outlet may be in fluid communication with an inlet (33) of the first PSA system (29). The first PSA system (29) may be used to remove the second content (5) of the $H_2O$ and form the third vent gas (3), as seen in FIGS. 1 and 2. The second vent gas (2) preferably enters the first PSA system (29) through the inlet (33) and exits through a first discharge end (35), i.e., a first discharge valve. Preferably, the first PSA system (29) includes two first discharge ends (35).

The first PSA system (29) also preferably includes a first adsorbent bed (30). It is contemplated that the first PSA system (29) may include a plurality of first adsorbent beds (30), as seen in FIG. 2. More preferably the first PSA system (29) includes two first adsorbent beds (30). Preferably, the first adsorbent bed (30) includes a water adsorbent material (31) that preferentially adsorbs $H_2O$ as compared to other gases in the second vent gas (2). The first PSA system (29) also preferably includes a dry gas product tank (32), fluid movers (not shown) valves, and instrumentation (not shown) that may be selected by one skilled in the art.

Once in the first PSA system (29), the second vent gas (2) preferably flows into the first adsorbent bed (30) at a first adsorption pressure, and for a first pressurization time, from the inlet (33). Preferably, the first adsorption pressure includes a pressure of from 20 to 90, more preferably of from 25 to 50, and most preferably of from 30 to 40, psia.

As the second vent gas (2) flows through the first adsorbent bed (30), the $H_2O$ preferably adsorbs onto and saturates the water adsorbent material (31) closest to the inlet (33) for a first adsorption time. Preferably, the water adsorbent material (31) includes, but is not limited to, hydrophilic adsorbents, hydrophobic adsorbents, polymeric adsorbents, activated carbon, carbon molecular sieve adsorbents, activated alumina, silica gel, zeolites including those with type A, X, Y, ZSM-5, silicalite, mordenite, desiccants, and combinations thereof. More preferably, the water adsorbent material (31) includes various grades of silica gel and alumina. Most preferably, the water adsorbent material (31) includes a silica gel commercially available from Grace Davison of Columbia, Md., under the trade name Davison 03. The silica gel has a high selectivity for the $H_2O$ over the $N_2$, the $H_2$, NO, and $N_2O$ thereby increasing an efficiency of removing the $H_2O$ from the second vent gas (2). However, it is contemplated that the silica gel may also adsorb some of the $N_2O$ from the second vent gas (2). If this occurs, the $N_2O$ may be separated from the $H_2O$ with additional adsorption and desorption techniques. The other gases such as $CO_2$ may also be removed from the second vent gas (2) using any adsorption method known in the art.

As the $H_2O$ preferably adsorbs onto the water adsorbent material (31), the other gases in the second vent gas (2) such as $H_2$, NO, $N_2O$, and $N_2$, preferably flow out of the first discharge end (35) of the first adsorbent bed (30) and the third vent gas (3) is formed, as first introduced above. After leaving the first discharge end (35) of the first adsorbent bed (30), the third vent gas (3) preferably continues to flow (3) into the dry gas product tank (32) preferably in fluid communication with the first discharge end (35) of the first adsorbent bed (30).

If the water adsorbent material (31) closest to the inlet (33) becomes saturated, the $H_2O$ preferably adsorbs onto the water adsorbent material (31) immediately next to the saturated water adsorbent material (31) in a direction towards the first discharge end (35). If all of the water adsorbent material (31) from the inlet (33) to the first discharge end (35) becomes saturated, the $H_2O$ may breakthrough the first adsorbent bed (30). Preferably, flow of the second vent gas (2) is stopped before breakthrough of the $H_2O$ from the first adsorbent bed (30).

Once the flow of the second vent gas (2) is stopped, the first adsorbent bed (30) is preferably counter-currently depressurized to a pressure below that first adsorbent pressure for a first blowdown time. It is to be understood that "counter-currently" includes a flow of a gas in an opposite direction of a flow of the second vent gas (2) (e.g., within the first adsorbent bed (30).

If the third vent gas (3) flows into the dry gas product tank (32), the third vent gas (3) may be used to further counter-currently de-pressurize and/or re-pressurize and purge the first adsorbent bed (30), at a first desorption pressure and a purge flow rate, to assist a desorption of the $H_2O$ from the water adsorbent material, thereby regenerating the first adsorbent bed (30). Specifically, the first discharge end (35) and inlet (33) may be closed and a valve (36) and the purge valve (37) may be opened to allow the third vent gas (3) to flow through and out of the first adsorbent bed (30) and into the moisture separator (43). If the third vent gas (3) is used to further counter-currently de-pressurize and/or re-pressurize and purge the first adsorbent bed (30), the first desorption pressure preferably includes a pressure of from 0.5 to 30, and more preferably from 1 to 15, psia. It is also contemplated that a variety of intermediate con-current depressurization steps and purges may be utilized to improve formation of the third vent gas (3). Also, the first adsorbent bed (30) may be purged with nitrogen (12) to improve formation of the third vent gas (3).

Figure 4:
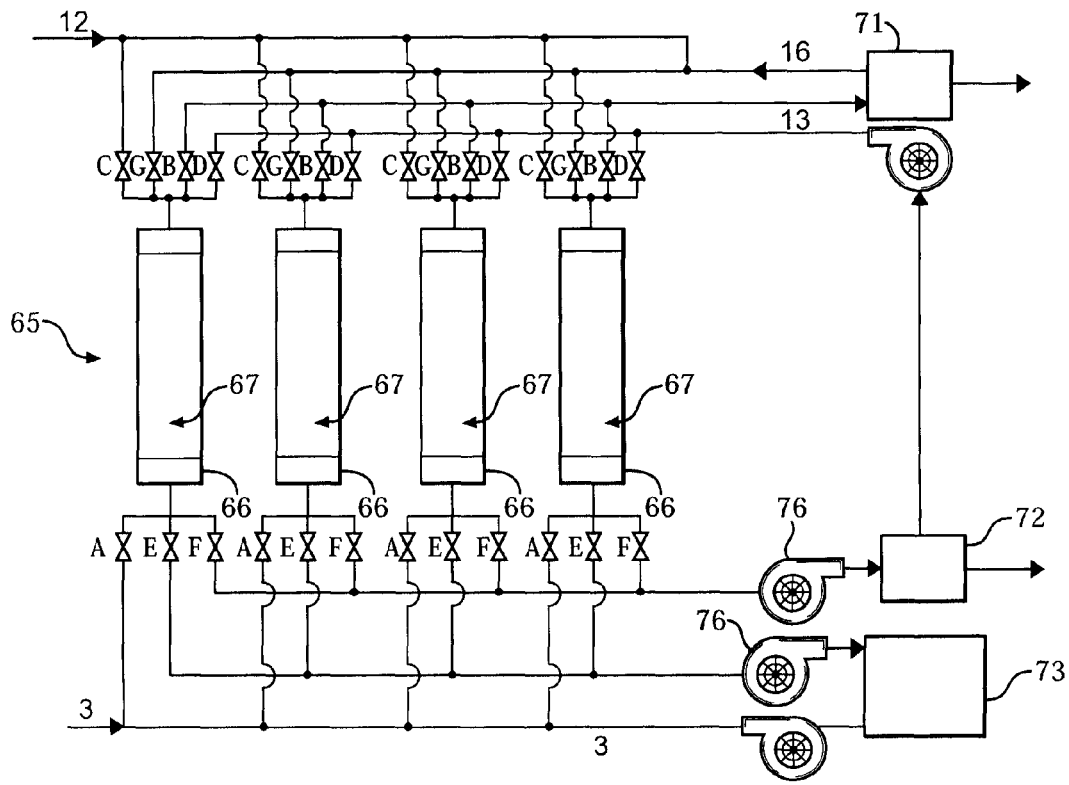
FIG. 4 is a schematic view of an embodiment of the present invention that is exemplary of the second PSA system that includes four second adsorbent beds.

Preferably, after entering the dry gas product tank (32), the third vent gas (3) enters into a second PSA system (65). Preferably, the second PSA system (65) is similar to the first PSA system (29) including similar fluid movers, valves and instrumentation that are known in the art. However, it is also contemplated that that the second PSA system (65) may be different from the first PSA system (29). The second PSA system (65) preferably includes a second adsorbent bed (66), and it is contemplated that the second PSA system (65) may include a plurality of second adsorbent beds (66). More preferably, the second PSA system (65) includes four second adsorbent beds (66), as seen in FIG. 4. Preferably, the second adsorbent bed (66) includes the nitrous oxide adsorbent material (67). It is contemplated that the nitrous oxide adsorbent material (67) may be disposed in any vessel known in the art. The second PSA system (65) also may include a light product or $N_2O$ lean product tank (71), an $N_2O$ product tank (72), a recycle tank (73), and fluid movers, valves, and instrumentation that are known in the art.

Preferably, the third vent gas (3) enters the second PSA system (65) through an inlet valve (A) at a second adsorption pressure and for a second pressurization time, and exits through a second discharge end (B), e.g., a second discharge valve. In one embodiment, the second adsorption pressure preferably includes a pressure of from 10 to 75, more preferably of from 15 to 40, and even more preferably of from 15 to 30, psig. Most preferably, in this embodiment, the second adsorption pressure is 15 psig. In another embodiment, the second adsorption pressure preferably includes a pressure of from 25 to 90, more preferably of from 30 to 55, and even more preferably of from 30 to 45, psia. In this embodiment, the second adsorption pressure is most preferably 30 psia.

As the third vent gas (3) flows through the second adsorbent bed (66), the $N_2O$ preferably adsorbs onto and saturates the nitrous oxide adsorbent material (67) closest to the inlet valve (A) for a second adsorption time. The nitrous oxide adsorbent material (67) includes the particles, introduced above. Typically, there are void spaces between the particles. The nitrous oxide adsorbent material (67) preferably adsorbs $N_2O$ over $H_2$, NO, $N_2$, other gases and trace components present in the third vent gas (3). The first embodiment of the present invention includes the step of flowing the third vent gas (3) through the nitrous oxide adsorbent material (67) such that the $N_2O$ adsorbs onto the particles. It is contemplated that the first embodiment may also include the step of flowing the third vent gas (3) through the void spaces of the particles.

Preferably, the nitrous oxide adsorbent material (67) includes, but is not limited to, hydrophilic adsorbents, hydrophobic adsorbents, polymeric adsorbents, activated carbon, carbon molecular sieve adsorbents, activated alumina, silica gel, zeolites including those with type A, X, Y, ZSM-5, silicalite, mordenite, and combinations thereof. More preferably the nitrous oxide adsorbent material (67) includes 5A zeolite, ZSM-5, and LiX. Most preferably, the nitrous oxide adsorbent material (67) includes a hydrophobic zeolite molecular sieve currently commercially available from UOP LLC of Des Plaines II, under the trade name of HISIV-3000. Use of the HISIV-3000 allows for efficient adsorption and removal of the $N_2O$ from the third vent gas (3).

If the $N_2O$ preferably adsorbs onto the nitrous oxide adsorbent material (67), the other gases in the third vent gas (3) such as $H_2$, NO, and $N_2$, other gases and trace components, known as a multi-component gas, preferably flow out of the second discharge end (B) of the second adsorbent bed (66). Preferably, the multi-component gas flowing out of the second discharge end (B) flows into the light product tank (71). It is also contemplated that the multi-component gas may be used to purge the second adsorbent bed (66) for an $N_2O$ lean purge time.

If the nitrous oxide adsorbent material (67) closest to the inlet valve (A) becomes saturated, the $N_2O$ preferably adsorbs onto nitrous oxide adsorbent material (67) immediately next to the saturated nitrous oxide adsorbent material (67) in a direction towards the second discharge end (B). If all of the nitrous oxide adsorbent material (67) from the inlet valve (A) to the second discharge end (B) becomes saturated, the $N_2O$ may breakthrough. Preferably, flow of the third vent gas (3) is stopped before breakthrough of the $N_2O$.

The first embodiment of the present invention also includes the step of forming the buffer zone including $N_2$ adjacent to the nitrous oxide adsorbent material (67). Preferably, the nitrous oxide adsorbent material (67) is isolated from the flow of the third vent gas (3) prior to the formation of the buffer zone. Preferably, the $N_2$ (12) is flowed into the second adsorbent bed (66) through a first gas valve (C) at the second adsorption pressure, for an $N_2$ pressurization time, and at an $N_2$ pressurization rate (also known as an $N_2$ purge rate), to form the buffer zone. Most preferably, the first embodiment includes the step of flowing the nitrogen counter-currently to the flow of the third vent gas (3) after the nitrous oxide adsorbent material (67) is isolated from the flow of the third vent gas (3).

Referring now to the step of flowing additional $N_2O$ through the nitrous oxide adsorbent material (67), first introduced above, the step of flowing may include the step of flowing substantially pure $N_2O$ (13) through the void spaces. Most preferably, the additional $N_2O$ and/or the substantially pure $N_2O$ is flowed counter-currently to the flow of the third vent gas (3). The substantially pure $N_2O$ (13) is preferably counter-currently flowed at the second adsorption pressure, for an $N_2O$ rinse time, and at an $N_2O$ rinse rate, via a second gas valve (D) to displace the $N_2$ (12) and/or any third vent gas (3) in the void spaces, away from the second discharge end (B) of the second adsorbent bed (66). After flowing the additional $N_2O$, the buffer zone is preferably disposed between the additional $N_2O$ and the third vent gas (3) in the void spaces. Without intending to be bound by any particular theory, it is believed that through displacing the $N_2$ (12) and/or any third vent gas (3) in the void spaces by admitting pure $N_2O$, the admitted $N_2O$ as well as any $N_2O$ which was previously adsorbed may be desorbed from the nitrous oxide adsorbent material (67) in high purity. If the $N_2$ (12) and/or any third vent gas (3) in the void spaces is displaced away from the second discharge end (B), a first effluent, leaving inlet valve (A), is preferably produced. This first effluent may be recycled to back into the third vent gas (3). Preferably, the flow of the substantially pure $N_2O$ (13) is stopped immediately before the $N_2$ is displaced out of the inlet valve (A) of the second adsorbent bed (66).

The first embodiment also includes the step of desorbing the $N_2O$ from the nitrous oxide adsorbent material (67). Preferably, after the flow of the substantially pure $N_2O$ (13) is stopped, a pressure of the second adsorbent bed (66) may be lowered through counter-current depressurization to a second desorption pressure for a second blowdown time to desorb the $N_2O$ at a desorption rate and for a second desorption time, thereby producing a second effluent. The second effluent preferably flows out of the second adsorbent bed (66) via a third gas valve (F) and into the $N_2O$ product tank (72) via appropriate fluid movers (76), valves, and instrumentation that are well known in the art. The second effluent may include amounts of less than or equal to 100 mol % $N_2O$, less than or equal to 90 mol % $N_2$, less than or equal to 5 mol % NO, and less than or equal to 5 mol % $H_2$. In one embodiment, the second effluent includes of from 7 to 100 mol % $N_2O$, 50 to 90 mol % $N_2$, 1 to 5 mol % NO, and 1 to 5 mol % $H_2$. It is to be understood that any method known in the art may be used to desorb the $N_2O$. In one embodiment, the second desorption pressure preferably includes a pressure of from 0.5 to 10, more preferably of from 0.5 to 6, and even more preferably of from 0.5 to 3, and still more preferably of from 0.5 to 1.5, psia. Most preferably, in this embodiment, the second desorption pressure is from 1 to 1.5 psia. In another embodiment, second desorption pressure preferably includes a pressure of from 0.5 to 15, more preferably of from 0.5 to 10, and even more preferably of from 1 to 3, psia. Most preferably, in this embodiment, the second desorption pressure is 1.5 psia.

After the $N_2O$ is desorbed from the nitrous oxide adsorbent material (67), the first embodiment preferably includes the step of forming a second buffer zone, including the $N_2$ (12), adjacent to the nitrous oxide adsorbent material (67). Preferably, the $N_2$ (12) is flowed into the second adsorbent bed (66) at the second desorption pressure to form the second buffer zone. Preferably, the step of forming the second buffer zone includes the step of flowing the nitrogen counter-currently to the flow of the third vent gas (3). The second buffer zone preferably is used to displace any remaining $N_2O$ in the void spaces.

After forming the second buffer zone, the multi-component gas from the light product tank (71) is preferably flowed through the nitrous oxide adsorbent material (67) at the second desorption pressure, via a fourth gas valve (G) to re-pressurize the first adsorbent bed (30). It is also contemplated that the multi-component gas may be flowed through the nitrous oxide adsorbent material (67) and through the void spaces. Preferably, the multi-component gas is flowed counter-currently to the third vent gas (3). If the multi-component gas is flowed through the nitrous oxide adsorbent material (67), the $N_2$ (12) is preferably displaced from the void spaces in a third effluent such that additional amounts of the third vent gas (3) can be utilized. Preferably, the third effluent flows via a fifth gas valve (E) to a recycle tank (73) via appropriate fluid movers (76), valves and instrumentation that are well known in the art. Preferably, flow of the third effluent is stopped once the $N_2$ (12) is displaced from the void spaces. It is also contemplated that a variety of intermediate concurrent and/or counter-current depressurization steps and purges may be utilized to improve recovery or purity of the $N_2O$ present in the second effluent.

Figure 3:
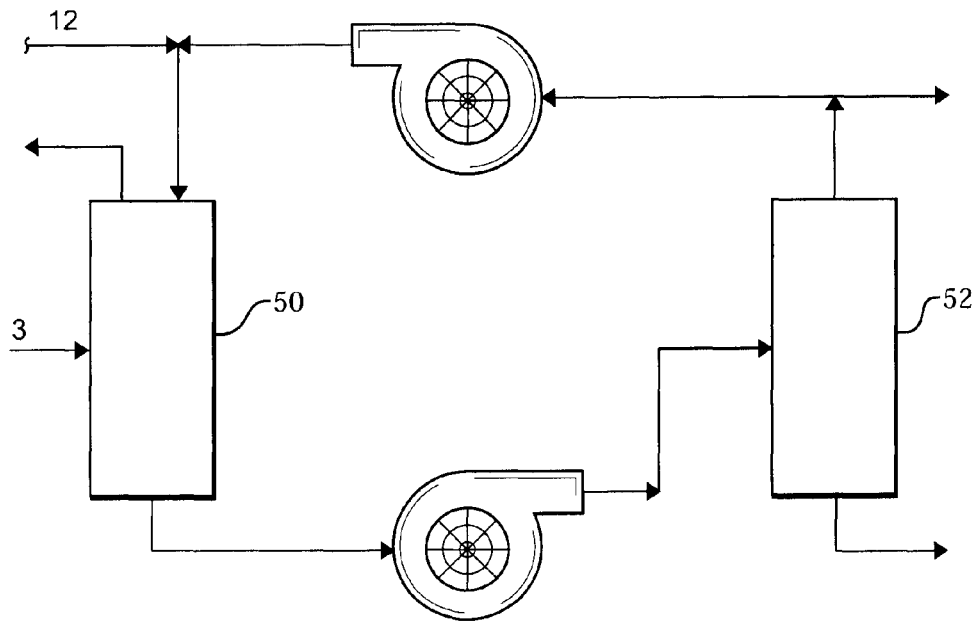
FIG. 3 is a schematic view of an embodiment of the present invention that is exemplary of the first and second PSA systems.

It is also contemplated that a plurality of additional PSA systems (50, 52) may be used in the present invention to increase a purity of the $N_2O$ present in the second effluent, as seen in FIG. 3. The additional PSA systems (50, 52) may be the same as the first and the second PSA systems (29, 65) or may be different. However, it is preferred that each of the additional PSA systems (50, 52) operate in a similar manner as the first and the second PSA systems (29, 65). Specifically, each of the additional PSA systems (50, 52) preferably includes a second nitrous oxide adsorbent material. Preferably, the second nitrous oxide adsorbent material is the same as the nitrous oxide adsorbent material (67). However, the second nitrous oxide adsorbent material may be different from the nitrous oxide adsorbent material (67).

In a second embodiment of the method, the method includes the steps of the first embodiment including the step of flowing the third vent gas (3) through the nitrous oxide adsorbent material (67) such that the $N_2O$ is adsorbed onto the particles. The second embodiment also includes the step of forming the buffer zone including the $N_2$ (12), adjacent to the nitrous oxide adsorbent material (67). The second embodiment also includes the step of flowing the additional $N_2O$ through the nitrous oxide adsorbent material (67) to displace the other gas. The second embodiment further includes the step of desorbing the $N_2O$ from the nitrous oxide adsorbent material (67). Preferably, the $N_2O$ is desorbed by lowering a pressure of the second adsorbent bed (66) through counter-current depressurization. The second embodiment still further includes the step of forming the second buffer zone including the $N_2$ (12) adjacent to the nitrous oxide adsorbent material (67) after desorbing the $N_2O$ from the nitrous oxide adsorbent material (67). It is to be understood that the second embodiment may also include any and/or all of the steps of the first embodiment.

In a third embodiment of the method, the method includes the step of synthesizing hydroxylamine thereby producing the third vent gas (3). It is to be understood that the hydroxylamine may be synthesized by any method known in the art. The third embodiment also includes the steps of the first embodiment including the step of flowing the third vent gas (3) through the nitrous oxide adsorbent material (67) such that the $N_2O$ is adsorbed onto the particles. The third embodiment also includes the step of forming the buffer zone including the $N_2$ (12), adjacent to the nitrous oxide adsorbent material (67). The third embodiment also includes the step of flowing the additional $N_2O$ through the nitrous oxide adsorbent material (67) to displace the other gas. The third embodiment further includes the step of desorbing the $N_2O$ from the nitrous oxide adsorbent material (67). Preferably, the $N_2O$ is desorbed by lowering a pressure of the second adsorbent bed (66) through counter-current depressurization. It is to be understood that the third embodiment may also include any and/or all of the steps of the first and/or second embodiment.

In a fourth embodiment of the method, the method includes the step of adsorbing the $N_2O$ from the third vent gas (3) onto the nitrous oxide adsorbent material (67). It is contemplated that the N₂O may be adsorbed onto the nitrous oxide adsorbent material (67) by any method known in the art including, but not limited to, passing the N₂O over, through, or around the nitrous oxide adsorbent material (67).

The fourth embodiment also includes the step of forming the buffer zone adjacent to the nitrous oxide adsorbent material (67), as in the first through third embodiments. The fourth embodiment further includes the step of flowing additional N₂O into the nitrous oxide adsorbent material (67). The fourth embodiment still further includes the step of desorbing the N₂O from the nitrous oxide adsorbent material (67), as in the first through third embodiments. It is to be understood that the fourth embodiment may also include any and/or all of the steps of the first through third embodiments. It is contemplated that in each of the PSA systems, the adsorbent beds may be re-pressurized at any point in the method, as determined by one skilled in the art depending on the desired results of the method.

EXAMPLES

Hydroxylamine can be formed in a reactor (26) by combining nitric oxide gas (NO), nitrogen gas (N₂), and hydrogen gas (H₂) in an aqueous medium to partially hydrogenate the NO. As a result, nitrous oxide gas (N₂O) is formed as a gaseous by-product. The N₂O and H₂O, in addition to unused N₂, H₂, and NO, are preferably removed from the reactor in a first vent gas (1).

The first vent gas (1) typically includes approximately 67% H₂, 14% NO, 9% N₂, 4% H₂O, 8% N₂O, and a trace amount of other gases such as methane, CO₂ and CO. However, the following examples utilize synthetic mixtures of the aforementioned gases representative of a typical first vent gas (1). The synthetic mixtures of the gases are hereafter referred to as "mixtures."

A first pressure swing adsorption (PSA) system (29) is employed and utilizes a first mixture of N₂, N₂O, and H₂O. A second PSA system (65) is also employed and utilizes second and third mixtures. The second mixture includes N₂ and N₂O, while the third mixture includes Helium (He) to represent H₂, N₂, NO, and also includes N₂O. A removal unit (27) is not used with the first, second, and third mixtures.

The first PSA system (29) includes a water adsorbent material (31) that has a high selectivity for the H₂O, thereby allowing for removal of the H₂O from the first mixture. Specific parameters used in the first PSA system (29) along with the results of the removal of the H₂O from the first mixture are set forth in Table 1. A first pressurization time, a first adsorption time, and a first blowdown time, included in Table 1, are as first introduced and described above.

More specifically, the first PSA system (29) includes two first adsorbent beds (30), bed A and bed B, respectively. The first adsorbent beds (30) are constructed from two inch Sch 80 PVC pipe and include Davison 03 commercially available from Grace Davison of Columbia, Md., as the water adsorbent material (31). In all examples in Table 1, the length of the first adsorbent beds (30) is 5.47 inches, the mass of the water adsorbent material (31) in bed A is 180.41 grams, the mass of the water adsorbent material (31) in bed B is 180.43 grams, and the amount of H₂O in the first mixture used in Table 1 is 50% relative humidity at 25° C. and 31 psia.

TABLE 1

| Examples | First Pressurization Time (s) | First Adsorption Time (s) | First Blowdown Time (s) | H₂O Initially Present (ppm) | H₂O Finally Present (ppm) |
|---|---|---|---|---|---|
| Example 1 | 10 | 620 | 10 | 7463 | 1535 |
| Example 2 | 10 | 600 | 10 | 7413 | 252.6 |
| Example 3 | 10 | 600 | 10 | 7423 | 21.4 |
| Example 4 | 10 | 600 | 10 | 7274 | 25.7 |

H₂O initially present includes an amount of H₂O initially present in the first mixture. Similarly, H₂O finally present includes an amount of H₂O finally present in the first mixture.

The second PSA system (65) includes a nitrous oxide adsorbent material (67) that has a high selectivity for the N₂O. A rinse with substantially pure N₂O to aid in removal of the N₂O from the nitrous oxide adsorbent material (67) is also utilized with the second PSA system (65). Specific parameters used in the second PSA system (65) along with the results of the removal of the N₂O from the second and third mixtures, are set forth in Table 2. A second pressurization time, a second adsorption time, an N₂ pressurization time, an N₂O rinse time, an N₂O rinse rate, a second blowdown time, a second desorption time, and a desorption rate (also known as an N₂O product flow rate), included in Table 2, are as first introduced and described above.

More specifically, the second PSA system (65) includes four second adsorbent beds (66), bed C, bed D, bed E, and bed F, respectively. The second adsorbent beds (66) are constructed from one inch 304 SS pipe and include HISIV-3000 commercially available from UOP LLC of Des Plaines, Ill., as the nitrous oxide adsorbent material (67). In all examples in Table 2, the length of the second adsorbent beds (66) is 27.4 inches, the mass of the nitrous oxide adsorbent material (67) in bed C is 172.500 grams, the mass of the nitrous oxide adsorbent material (67) in bed D is 172.489 grams, the mass of the nitrous oxide adsorbent material (67) in bed E is 172.659 grams, and the mass of the nitrous oxide adsorbent material (67) in bed F is 172.508 grams. Examples 1 to 8 utilize the second mixture while example 9 utilizes the third mixture.

TABLE 2

| Examples | Second Pressurization Time (s) | Second Adsorption Time (s) | N₂ Pressurization Time (s) | N₂O Rinse Time (s) | Second Blow Down Time (s) |
|---|---|---|---|---|---|
| Example 1 | 10 | 50 | 1 | 49 | 10 |
| Example 2 | 20 | 100 | 2 | 98 | 20 |
| Example 3 | 20 | 100 | 2 | 98 | 20 |
| Example 4 | 20 | 100 | 2 | 98 | 20 |
| Example 5 | 20 | 100 | 2 | 98 | 20 |
| Example 6 | 20 | 100 | 2 | 98 | 20 |
| Example 7 | 20 | 100 | 2 | 98 | 20 |
| Example 8 | 10 | 100 | 2 | 98 | 20 |

TABLE 2-continued

| Example 9 | 20 | 100 | 2 | 98 | 20 |
|---|---|---|---|---|---|

| Examples | Second Desorption Time (s) | N₂O lean Purge Time (s) | Total Time (s) | N₂O Rinse Rate (slm) | Desorption Rate (slm) |
|---|---|---|---|---|---|
| Example 1 | 40 | 40 | 200 | unknown | 0.294 |
| Example 2 | 80 | 80 | 400 | 2.27 | 0.415 |
| Example 3 | 80 | 80 | 400 | 3.00 | 0.338 |
| Example 4 | 80 | 80 | 400 | 3.00 | 0.169 |
| Example 5 | 80 | 80 | 400 | 2.70 | 0.241 |
| Example 6 | 80 | 80 | 400 | 3.13 | 0.139 |
| Example 7 | 80 | 80 | 400 | 3.13 | 0.144 |
| Example 8 | 80 | 90 | 400 | 3.19 | 0.141 |
| Example 9 | 80 | 80 | 400 | 3.13 | 0.126 |

| Examples | Mixture Concentration (% N₂O) | Mixture Flow Rate (slm) | Maximum Pressure of 2$^{nd}$ PSA System (psia) | Minimum Pressure of 2$^{nd}$ PSA System (psia) | Pressure Ratio (Maximum:Minimum Pressure) |
|---|---|---|---|---|---|
| Example 1 | 9.41 | 14.890 | 30.8 | 2.6 | 11.8 |
| Example 2 | 7.29 | 5.386 | 28.6 | 1.5 | 19.1 |
| Example 3 | 8.13 | 3.372 | 29.5 | unknown | unknown |
| Example 4 | 8.13 | 3.372 | 31.6 | 2.1 | 15.0 |
| Example 5 | 9.37 | 1.751 | 29.5 | 1.5 | 19.7 |
| Example 6 | 8.14 | 2.031 | 30.7 | 1.5 | 20.5 |
| Example 7 | 8.14 | 2.031 | 30.6 | 1.3 | 23.5 |
| Example 8 | 8.14 | 2.031 | 30.6 | 1.3 | 23.5 |
| Example 9 | 8.32 | 2.047 | 30.0 | 1.4 | 21.4 |

| Examples | Purity of N₂O Removed (mol %) | Percent of N₂O Removed (%) |
|---|---|---|
| Example 1 | 86.6 | 19.2 |
| Example 2 | 76.7 | 81.0 |
| Example 3 | 89.9 | >95 |
| Example 4 | 93.9 | 95.3 |
| Example 5 | 94.4 | 94.0 |
| Example 6 | 97.7 | 81.9 |
| Example 7 | 97.3 | 84.7 |
| Example 8 | 96.5 | 82.2 |
| Example 9 | 99.1 | 73.3 |

The mixture concentration includes a percentage of N₂O originally present in the second and third mixtures based on a total volume of the second and third mixtures, before the N₂O is removed using the second PSA system (65).

The mixture flow rate includes a rate that the second and third mixtures are introduced into the second PSA system (65).

The purity of the N₂O removed includes a measurement of the purity of the N₂O that is removed from the second and third mixtures.

The percent of the N₂O removed includes a measurement of an amount of the N₂O that is removed from the second and third mixtures as compared to a total amount of N₂O present in the second and third mixtures, respectively.

Computer simulations are also employed and are used to determine optimal N₂O removal using an experimental PSA system. Initially, the computer simulation is verified against lab results of examples 2, 6 and 9 in Table 2. The specific parameters used in the computer simulations along with the expected results of the removal of the N₂O, are represented by the Ideal Example, are set forth in Table 3. The desorption rate, the N₂O rinse rate, and the N₂ pressurization rate, included in Table 3, are as described and set forth above.

The Ideal Example includes parameters optimized for maximum removal of N₂O from a hypothetical third vent gas (3) including H₂, NO, N₂O, NO, as well minor components such as methane, and CO₂, similar to an actual third vent gas (3). In the Ideal Example, the purity of the N₂O exceeds 99% which is considered commercially pure and is suitable for commercial sale.

TABLE 3

| Examples | Total Time (s) | Maximum Pressure of Experimental PSA System (psia) | Minimum Pressure of Experimental PSA System (psia) | Pressure Ratio (Maximum:Minimum Pressure) |
|---|---|---|---|---|
| Example 2 | 400 | 28.6 | 1.5 | 19.1 |
| Example 6 | 400 | 30.7 | 1.5 | 20.5 |
| Example 9 | 400 | 30.0 | 1.4 | 21.4 |
| Ideal | 400 | 29.7 | 1.7 | 17.5 |

| Examples | Purity of N₂O Removed | Percent of N₂O Removed | Desorption Rate (slm) | Mixture Concentration (% N₂O) |
|---|---|---|---|---|
| Example 2 | 76.6 | 87.1 | 0.438 | 7.29 |
| Example 6 | 97.7 | 83.0 | 0.143 | 8.14 |
| Example 9 | 98.8 | 70.3 | 0.122 | 8.32 |
| Ideal | 99.5 | 93.9 | 0.066 | 8.32 |

TABLE 3-continued

| Examples | Mixture Flow Rate (slm) | N₂O Rinse Rate (slm) | N₂ Purge Rate (slm) |
|---|---|---|---|
| Example 2 | 5.289 | 1.75 | 0.228 |
| Example 6 | 2.058 | 3.04 | 0.052 |
| Example 9 | 2.070 | 2.99 | 0.010 |
| Ideal | 0.835 | 3.33 | 0.010 |

The mixture concentration includes a percentage of $N_2O$ present in the mixture used in the computer simulations, before removal with the experimental PSA system. The mixture flow rate includes a rate that the mixture used in the computer simulations is introduced into the experimental PSA system (e.g., a net feed flow rate).

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of removing nitrous oxide from a vent gas comprising the nitrous oxide and at least one other gas, said method comprising the steps of:
    flowing the vent gas through a nitrous oxide adsorbent material comprising particles such that the nitrous oxide is adsorbed onto the particles;
    forming a buffer zone comprising nitrogen adjacent to the nitrous oxide adsorbent material;
    flowing additional nitrous oxide through the nitrous oxide adsorbent material to displace the other gas; and
    desorbing the nitrous oxide from the nitrous oxide adsorbent material,
    wherein the buffer zone is disposed between the additional nitrous oxide and the vent gas.

2. A method as set forth in claim 1 further comprising the step of isolating the nitrous oxide adsorbent material from the flow of the vent gas prior to formation of the buffer zone.

3. A method as set forth in claim 2 wherein the step of forming the buffer zone comprises the step of flowing the nitrogen counter-currently to the flow of the vent gas after the nitrous oxide adsorbent material is isolated from the flow of the vent gas.

4. A method as set forth in claim 1 further comprising the step of forming a second buffer zone comprising the nitrogen adjacent to the nitrous oxide adsorbent material after desorbing the nitrous oxide from the nitrous oxide adsorbent material.

5. A method as set forth in claim 4 wherein the step of forming the second buffer zone comprises the step of flowing the nitrogen counter-currently to the flow of the vent gas.

6. A method as set forth in claim 1 wherein the step of flowing the additional nitrous oxide comprises flowing substantially pure nitrous oxide through the nitrous oxide adsorbent material.

7. A method as set forth in claim 1 wherein the step of flowing the additional nitrous oxide comprises flowing the additional nitrous oxide counter-currently to the flow of the vent gas.

8. A method as set forth in claim 1 further comprising the step of flowing a multi-component gas through the nitrous oxide adsorbent material.

9. A method as set forth in claim 8 wherein the step of flowing the multi-component gas comprises flowing the multi-component gas counter-currently to the vent gas.

10. A method as set forth in claim 1 wherein the nitrous oxide adsorbent material is disposed in an adsorbent bed and the step of desorbing the nitrous oxide comprises the step of lowering a pressure of the adsorbent bed.

11. A method of removing nitrous oxide from a vent gas comprising the nitrous oxide and at least one other gas, said method comprising the steps of:
    synthesizing hydroxylamine thereby producing the vent gas;
    flowing the vent gas through a nitrous oxide adsorbent material comprising particles such that the nitrous oxide is adsorbed onto the particles;
    forming a buffer zone comprising nitrogen adjacent to the nitrous oxide adsorbent material;
    flowing additional nitrous oxide through the nitrous oxide adsorbent material to displace the other gas; and
    desorbing the nitrous oxide from the nitrous oxide adsorbent material
    wherein the buffer zone is disposed between the additional nitrous oxide and the vent gas.

12. A method as set forth in claim 11 further comprising the step of isolating the nitrous oxide adsorbent material from the flow of the vent gas prior to formation of the buffer zone.

13. A method as set forth in claim 12 wherein the step of forming the buffer zone comprises the step of flowing the nitrogen counter-currently to the flow of the vent gas after the nitrous oxide adsorbent material is isolated from the flow of the vent gas.

14. A method as set forth in claim 11 further comprising the step of forming a second buffer zone comprising the nitrogen adjacent to the nitrous oxide adsorbent material after desorbing the nitrous oxide from the nitrous oxide adsorbent material.

15. A method as set forth in claim 14 wherein the step of forming the second buffer zone comprises the step of flowing the nitrogen counter-currently to the flow of the vent gas.

16. A method as set forth in claim 11 wherein the step of flowing the additional nitrous oxide comprises flowing substantially pure nitrous oxide through the nitrous oxide adsorbent material.

17. A method as set forth in claim 16 wherein the step of flowing the additional nitrous oxide comprises flowing the additional nitrous oxide counter-currently to the vent gas.

18. A method as set forth in claim 11 further comprising the step of flowing a multi-component gas stream through the nitrous oxide adsorbent material.

19. A method as set forth in claim 18 wherein the step of flowing the multi-component gas comprises flowing the multi-component gas counter-currently to the vent gas.

20. A method as set forth in claim 11 wherein the nitrous oxide adsorbent material is disposed in an adsorbent bed and the step of desorbing the nitrous oxide comprises the step of lowering a pressure of the adsorbent bed.

21. A method of removing nitrous oxide from a vent gas comprising the nitrous oxide and at least one other gas, said method comprising the steps of:
    adsorbing the nitrous oxide from a vent gas onto a nitrous oxide adsorbent material;
    forming a buffer zone comprising nitrogen adjacent to the nitrous oxide adsorbent material;
    flowing additional nitrous oxide into the nitrous oxide adsorbent material; and
    desorbing the nitrous oxide from the nitrous oxide adsorbent material, wherein the buffer zone is disposed between the additional nitrous oxide and the vent gas.

22. A method as set forth in claim 21 further comprising the step of forming a second buffer zone comprising the nitrogen adjacent to the nitrous oxide adsorbent material after desorbing the nitrous oxide from the nitrous oxide adsorbent material.

23. A method as set forth in claim 22 further comprising the step of isolating the nitrous oxide adsorbent material from the flow of the vent gas prior to formation of the buffer zone.

24. A method as set forth in claim 23 wherein the step of forming the buffer zone comprises the step of flowing the nitrogen counter-currently to the flow of the vent gas after the nitrous oxide adsorbent material is isolated from the flow of the vent gas.

25. A method as set forth in claim 22 wherein the step of forming the second buffer zone comprises the step of flowing the nitrogen counter-currently to the flow of the vent gas.

26. A method as set forth in claim 22 wherein the step of flowing the additional nitrous oxide comprises flowing substantially pure nitrous oxide through the nitrous oxide adsorbent material.

27. A method as set forth in claim 22 wherein the step of flowing the additional nitrous oxide comprises flowing the additional nitrous oxide counter-currently to the vent gas.

28. A method as set forth in claim 22 further comprising the step of flowing a multi-component gas stream through the nitrous oxide adsorbent material.

29. A method as set forth in claim 28 wherein the step of flowing the multi-component gas comprises flowing the multi-component gas counter-currently to the vent gas.

30. A method as set forth in claim 22 wherein the nitrous oxide adsorbent material is disposed in an adsorbent bed and the step of desorbing the nitrous oxide comprises the step of lowering a pressure of the adsorbent bed.

\* \* \* \* \*